O. A. SAVAGE.
SUPPORT.
APPLICATION FILED JAN. 7, 1922.
1,429,778.
Patented Sept. 19, 1922.
2 SHEETS—SHEET 2.
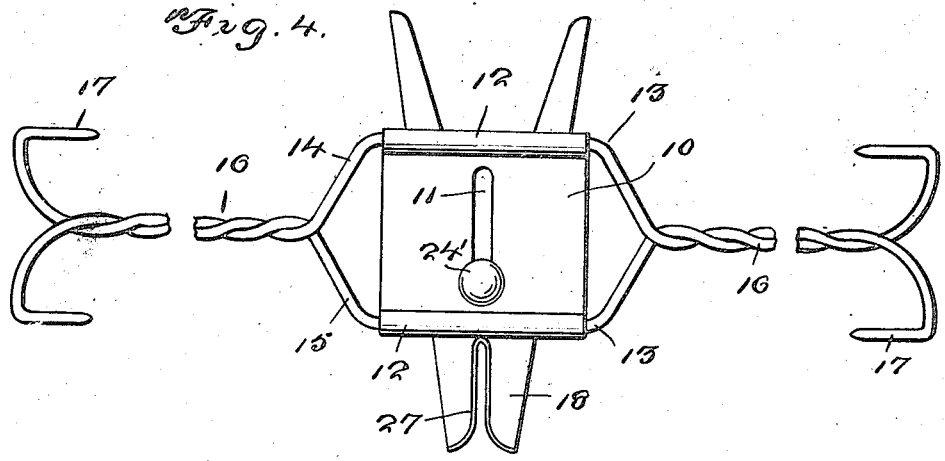
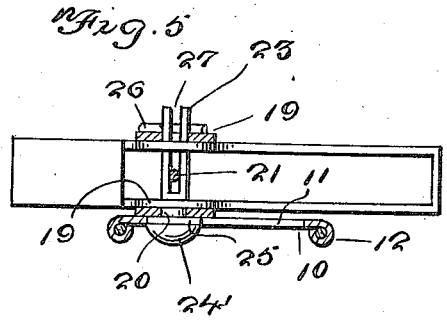
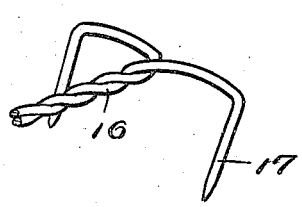
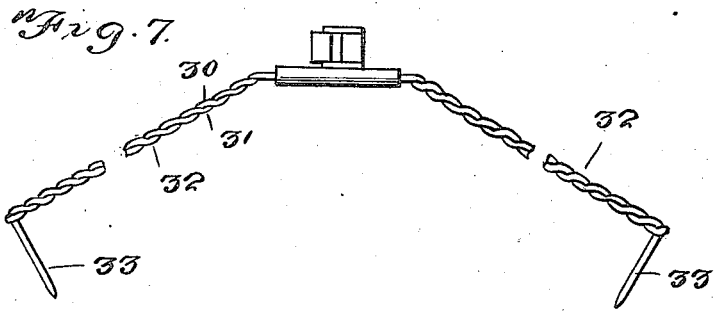
O. A. Savage
INVENTOR
BY Victor J. Evans
ATTORNEY Patented Sept. 19, 1922.

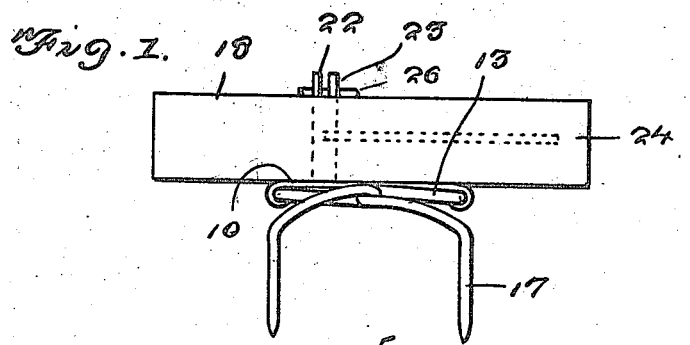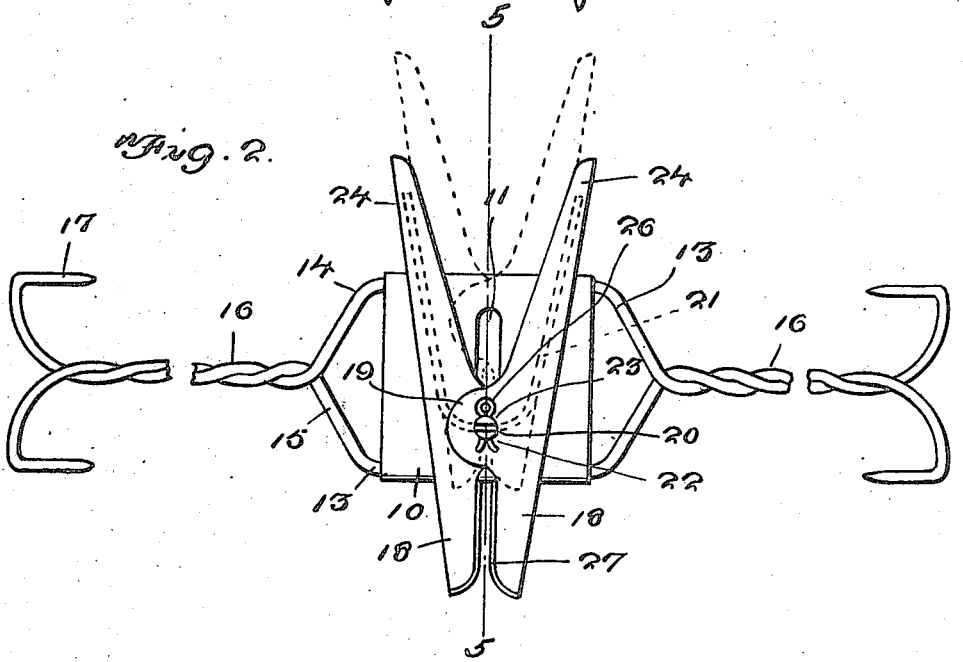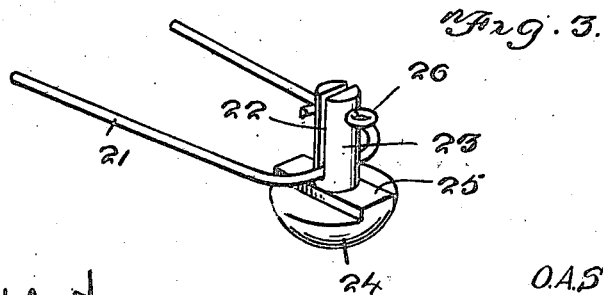

1,429,778

UNITED STATES PATENT OFFICE.

ORVILLE A. SAVAGE, OF PASO ROBLES, CALIFORNIA.

SUPPORT.

Application filed January 7, 1922. Serial No. 527,747.

*To all whom it may concern:*

Be it known that I, ORVILLE A. SAVAGE, a citizen of the United States, residing at Paso Robles, in the county of San Luis Obispo and State of California, have invented new and useful Improvements in Supports, of which the following is a specification.

This invention relates to improvements in supports.

An object of the invention is to provide a simple and efficient device which is adapted to support a small tree, plant, vine and the like when the roots thereof are received in an excavation.

Another object is to provide a reliable device embodying novel features of construction whereby the jaws of the device may be readily adjusted to retain the tree, vine, etc., in an upright position while dirt is being placed around the roots thereof in the excavation and thereby enable one person to plant the same.

Another object is to provide a strong and durable device which can be manufactured at a very low cost.

With the above and other objects in view, the invention consists in certain novel features of construction, combination and arrangements of parts, as will be more fully described and particularly pointed out in the appended claims.

In the accompanying drawings.

Figure 1 is a side elevation of the invention.

Figure 2 is a top plan view thereof.

Figure 3 is a detail perspective view of the headed stud and spring associated therewith.

Figure 4 is a bottom plan view of the invention.

Figure 5 is a sectional view taken on the line 5—5 of Figure 2.

Figure 6 is a detail perspective view of a portion of one of the arms and the prongs extending therefrom.

Figure 7 is a side elevation of a slight modification of the invention.

Referring now to the drawings, in which like characters of reference designate corresponding parts throughout the several views, the numeral 10 designates a horizontal base plate having a slot 11 formed therein and provided at opposite edges with grooves 12 which receive the parallel sides of a loop 13 formed of two wires 14 and 15 which are directed toward each other at the opposite ends of the plate and twisted to provide a pair of oppositely disposed horizontal arms 16. The wires, at the outer ends of the arms, are spread apart and bent downwardly to provide spaced parallel vertical prongs 17 which are adapted to be inserted in the ground.

A pair of oppositely swinging slidable jaws 18 engage the upper surface of the plate and are provided with right angular pivot ears 19 which have aligned vertical openings 20 formed therein. The jaws are normally closed by means of a spring 21 extending through a vertical slot 22 formed in a stud 23 which is located in the slot 11 in the plate and extends through the aligned openings 20 in the pivot ears. The opposite ends of the spring engage a pair of lever arms 24 extending from the jaws 18 upon the opposite side of the ears 19. The stud 23 is provided with a circular head 24' which engages the lower side of the plate. A transverse rib 25 is formed on the upper side of the head and engages the side walls of the slot 11 in the plate to guide the jaws and prevent the same from turning. A cotter pin 26 extends through a transverse opening in the lug adjacent to the upper end thereof and engages the upper surface of the upper ear 19 to retain the jaws upon the plate. Rubber strips 27 are secured to the contacting faces and outer ends of the jaws to prevent any injury to the plants, etc.

In the modification illustrated in Figure 7, the parallel strands of wire 30 and 31 forming the loop are directed toward each other at the opposite ends of the plate and twisted and then bent downwardly to provide a pair of oppositely disposed inclined arms 32 which are provided at their lower ends with spaced parallel vertical prongs 33.

In use, the prongs are struck into the ground to one side of the excavation and the lever arms are manipulated to cause the jaws to engage the trunk of the tree to retain the same in upright position while dirt is being placed in the excavation about the roots. The rubber strips on the jaws will prevent any injury to the tender shoots or trunk of the tree.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

1. A device for supporting trees, plants and the like in an upright position when the same are arranged in an excavation during the planting thereof, comprising a plate, means for supporting the plate in a horizontal position to one side of the excavation, and a pair of spring influenced jaws.

2. A device for supporting trees, plants and the like in an upright position when the same are arranged in an excavation during the planting thereof, comprising a plate removably supported above the earth to one side of the excavation, a pair of spring influenced jaws slidably mounted on said plate and means for guiding said jaws.

3. A device for supporting trees, plants and the like in an upright position when the same are arranged in an excavation during the planting thereof, comprising a plate removably supported above the earth to one side of the excavation, a pair of spring influenced jaws slidably mounted on the plate and adapted to engage the trees, guide means for said jaws, and means for retaining said jaws upon the plate.

4. A device for supporting trees, plants and the like in an upright position when the same are arranged in an excavation during the planting thereof, comprising a plate having a slot centrally arranged therethrough and provided with grooves on two opposite edges thereof, a loop having opposed parallel sides secured in said grooves, arms provided by said loop converging on opposite sides thereof, a plurality of spaced parallel prongs depending from said arms and adapted to support said plate horizontally and above the ground, a headed stud slidably mounted in said slot, and a pair of spring influenced jaws secured to the stud as and for the purpose specified.

In testimony whereof I affix my signature.

ORVILLE A. SAVAGE.